(12) United States Patent
Yamaguchi et al.

(10) Patent No.: US 8,666,332 B2
(45) Date of Patent: Mar. 4, 2014

(54) WATERPROOF-TYPE ELECTRONIC EQUIPMENT

(75) Inventors: Shingo Yamaguchi, Kawasaki (JP); Shigeo Ishikawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 281 days.

(21) Appl. No.: 12/844,387

(22) Filed: Jul. 27, 2010

(65) Prior Publication Data

US 2011/0045882 A1 Feb. 24, 2011

(30) Foreign Application Priority Data

Aug. 24, 2009 (JP) ................................. 2009-192976

(51) Int. Cl.
*H04B 1/38* (2006.01)

(52) U.S. Cl.
USPC ......................................... 455/90.3; 455/347

(58) Field of Classification Search
USPC .............. 455/90.3, 899, 344, 347, 128, 575.1
See application file for complete search history.

(56) References Cited

U.S. PATENT DOCUMENTS

| | | | |
|---|---|---|---|
| 6,368,131 B1 * | 4/2002 | Takeuchi et al. .............. | 439/271 |
| 6,983,130 B2 * | 1/2006 | Chien et al. .................. | 455/90.3 |
| 7,060,921 B2 * | 6/2006 | Kubo .......................... | 200/302.1 |
| 7,263,032 B2 * | 8/2007 | Polany et al. ................ | 367/131 |
| 7,436,653 B2 * | 10/2008 | Yang et al. .................. | 361/679.01 |
| 7,764,936 B2 * | 7/2010 | Nakasono et al. ............ | 455/128 |
| 2007/0189120 A1 * | 8/2007 | Yang et al. .................... | 367/131 |
| 2010/0085691 A1 * | 4/2010 | Yeh et al. ................... | 361/679.01 |
| 2010/0103632 A1 * | 4/2010 | Kato ............................ | 361/752 |

FOREIGN PATENT DOCUMENTS

| CN | 101018458 A | 8/2007 |
|---|---|---|
| JP | 2008-218633 A | 9/2008 |

OTHER PUBLICATIONS

Chinese Office Action corresponding to Chinese application No. 201010256126.7.

* cited by examiner

*Primary Examiner* — Sonny Trinh
(74) *Attorney, Agent, or Firm* — Arent Fox LLP (57) ABSTRACT

A waterproof-type electronic equipment includes first and second case parts together forming a housing. A seal material is provided between the first and second case parts. The seal material has a first surface including a fixed portion fixed to an inner surface of the first case part. The seal material has a contacting portion that makes a convex shape on a side opposite to the first surface to contact with the second case part. A recessed portion is provided on the inner surface of the first case part and outer side of the fixed portion of the seal material. The recessed portion is located at a position where the first surface of the seal material covers an opening of the recessed portion. A passage connects the recessed portion of the first case part and an exterior of the first case part to each other.

12 Claims, 10 Drawing Sheets

WATERPROOF-TYPE ELECTRONIC EQUIPMENT

CROSS-REFERENCE TO RELATED APPLICATIONS

This application is based upon and claims the benefit of priority of the prior Japanese Patent Application No. 2009-192976, filed on Aug. 24, 2009, the entire contents of which are incorporated herein by reference.

FIELD

The embodiment discussed herein is directed to waterproof-type electronic equipments.

BACKGROUND

There is a demand for electronic equipments such as, for example, a cellular phone to have a housing of a waterproof structure. In order to make a waterproof housing, there is suggested the following methods.
1) A method to make a sealed structure by compressing a sealing material by two case parts facing each other.
2) A method to make a sealed structure by applying a sealant between two case parts.
3) A method to make a sealed structure by attaching two case parts to each other using a double-stick tape.

In order to allow disassembling a housing (case) to repair or replace component parts inside the housing, the above-mentioned method 1) is suitable. According to the method 1), a seal material can be compressed to make a waterproof structure by fitting the seal material into a groove provided on one of the cases (a case body) and assembling the other case (a case lid) to the main case. The seal material is an elongated elastic material, which can provide a sealing function by being pressed by the main case and the case lid within the groove.

Here, there is suggested a waterproof structure with a seal material having a projection on a side surface thereof to maintain a waterproof property even if a water pressure changes (for example, refer to Japanese Laid-Open Patent Application No. 2008-218633). In this waterproof structure, a water pressure applied to a case acts as a force to further compress a seal material, and thereby a seal surface pressure can be increased as the water pressure is increased. Additionally, a waterproof property can be improved by improving a surface pressure of the projection formed on the side surface of the seal material by causing the seal material to be pressed toward inner side by a pressure of water entering through a gap between an upper case and a lower case. It should be noted that the same effect may be obtained by a seal material such as an O-ring having a cross section protruding in a side direction.

The above-mentioned sealed structures have the following problems.
1) A sealed structure in which a seal material is compressed between case parts facing each other.

An amount of compression of the seal material depends on assembly size dimensions, and, the amount of compression does not change even if a water pressure is applied to the sealed structure including the seal material. Therefore, even in a state where a case assembly is submerged, a repulsion force generated by the seal material and applied to the case assembly does not change. If an amount of compression of the seal material is increased to improve a seal property, there is a possibility that the case assembly is deformed, which results in the case assembly being opened.

In the waterproof structure disclosed in the above-mentioned Japanese Laid-Open Patent Application No. 2008-218633, the upper and lower case parts are assembled by being positioned to each other at a fitting position. Accordingly, even if a water pressure is increased, the compression of the seal material does not go beyond the compression by the upper and lower case parts at the fitting positions where the lower and upper case parts are assembled and fixed to each other. Moreover, although it is explained in the above-mentioned patent document that the seal material is displaced toward inside the case assembly in the retaining groove due to a water pressure exerted on the seal material, the seal material may be deformed but not displaced in the retaining groove toward inside the case assembly because a high surface pressure has already been generated due to compression by the upper and lower case parts and a friction is generated in the seal material, which is formed by a rubber-like elastic material.

2) A sealed structure using a seal agent.

A processing efficiency is not good because a manufacturing process cannot proceed to a subsequent process until the seal agent cures. Additionally, when disassembling the case assembly, the seal part is destroyed completely. Thus, the seal part must be removed completely if the case parts are reused. If the case parts are not reusable, the case parts are discarded, which generates a wasteful cost.

3) A seal structure using a double-stick tape.

Although a double-stick tape can be used to make a seal between flat surfaces, it is difficult to apply the double-stick tape to a three-dimensional surface. Additionally, if an adhesive of the double-stick tape remains on the case parts when the case assembly is disassembled, the remaining adhesive must be removed completely in order to reuse the case parts. If the remaining adhesive cannot be removed, the case parts must be discarded and use new case parts, which generates a wasteful cost.

SUMMARY

According to an aspect of the invention, a waterproof-type electronic equipment includes: a first case part and a second case part together forming a housing by being fit to each other; a seal material provided between the first case part and the second case part, the seal material having a first surface including a fixed portion fixed to an inner surface of the first case part, the seal material further having a contacting portion that makes a convex shape on a side opposite to the first surface to contact with the second case part; a recessed portion provided on the inner surface of the first case part and outer side of the fixed portion of the seal material, the recessed portion located at a position where the first surface of the seal material covers an opening of the recessed portion; and a passage connecting the recessed portion of the first case part and an exterior of the first case part to each other.

The object and advantages of the embodiment will be realized and attained by means of the elements and combinations particularly pointed out in the appended claims.

It is to be understood that both the foregoing general description and the following detailed description are exemplary explanatory only and are not restrictive of the invention, as claimed.

DESCRIPTION OF EMBODIMENT(S)

Preferred embodiment of the present invention will be explained with reference to the accompanying drawings.

Figure 1:
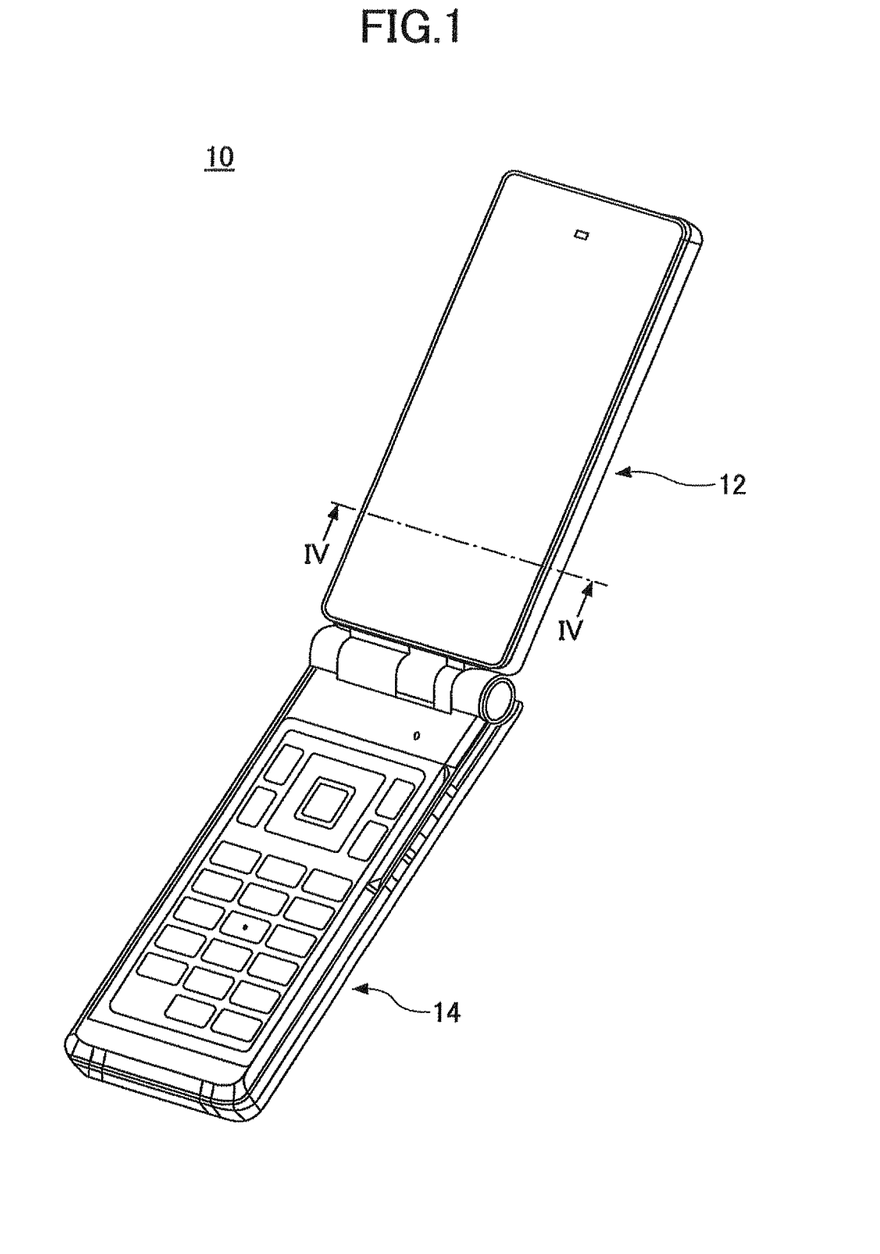
FIG. 1 is a perspective view of a waterproof-type cellular phone, which is an example of a waterproof-type electronic equipment according to a first embodiment.

FIG. 1 is a perspective view of a waterproof-type cellular phone, which is an example of a waterproof-type electronic equipment according to a first embodiment. The waterproof-type cellular phone 10 includes an operation part 12 provided with ten-keys and operation keys and a display part 14 rotatably attached to the operation part 12. A liquid display device (LCD) for image display and electronic parts are accommodated in a housing of the display part 14. A housing of the operation part 12 and the housing of the display part 14 have a waterproof structure so that the cellular phone 10 can be used under water. A description will be given below of the waterproof structure of the display part 14 as an example.

Figure 2:
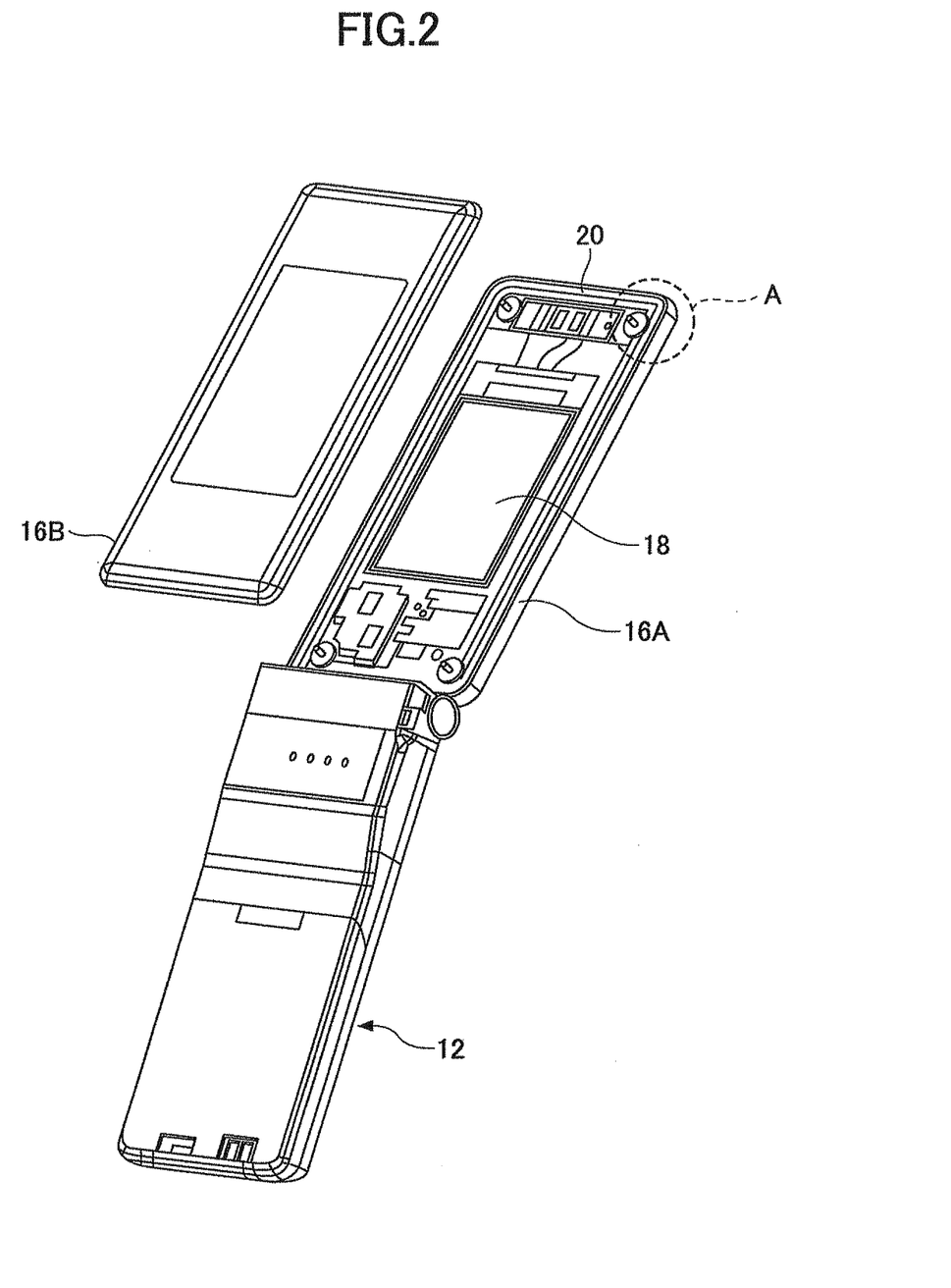
FIG. 2 is a perspective view of the waterproof-type cellular phone viewed from a back side.
Figure 3:
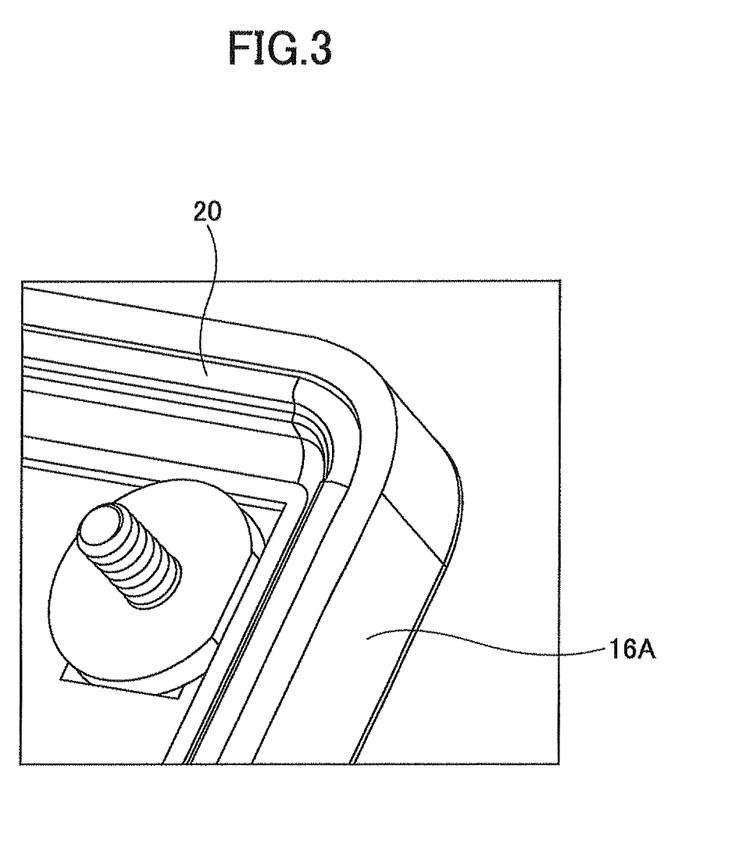
FIG. 3 is an enlarged perspective view of a part A in FIG. 2.

FIG. 2 is a perspective view of the waterproof-type cellular phone 10 illustrated in FIG. 1 viewed from a back side. FIG. 2 illustrates a state where a case lid (second case part) 16B is removed from a case body (first case part) 16A of the display part 14. FIG. 3 is an enlarge perspective view of a part A of FIG. 2. An LCD unit 18 and electronic parts are provided inside the case body 16A. The housing of the display part 14 is formed by fitting the case lid 16B to the case body 16A and fastening the case lid 16B to the case body 16A by screws from the front side.

In order to give a waterproofing function to the housing formed by the case body 16A and the case lid 16B, a waterproof structure is provided to the housing. The waterproof structure includes a seal material 20 attached to the case body 16A. The seal material is an elongated elastic material extending along an outer circumference of the case body 16A. The seal material 20 provides a sealing function to seal the fitting part between the case body 16A and the case lid 16B by being elastically compressed between the case body 16A and the case lid 16B. The seal material 20 may be formed by an elastic material such as, for example, a rubber, a low-hardness elastomer, a closed-cell sponge, etc.

Figure 4:
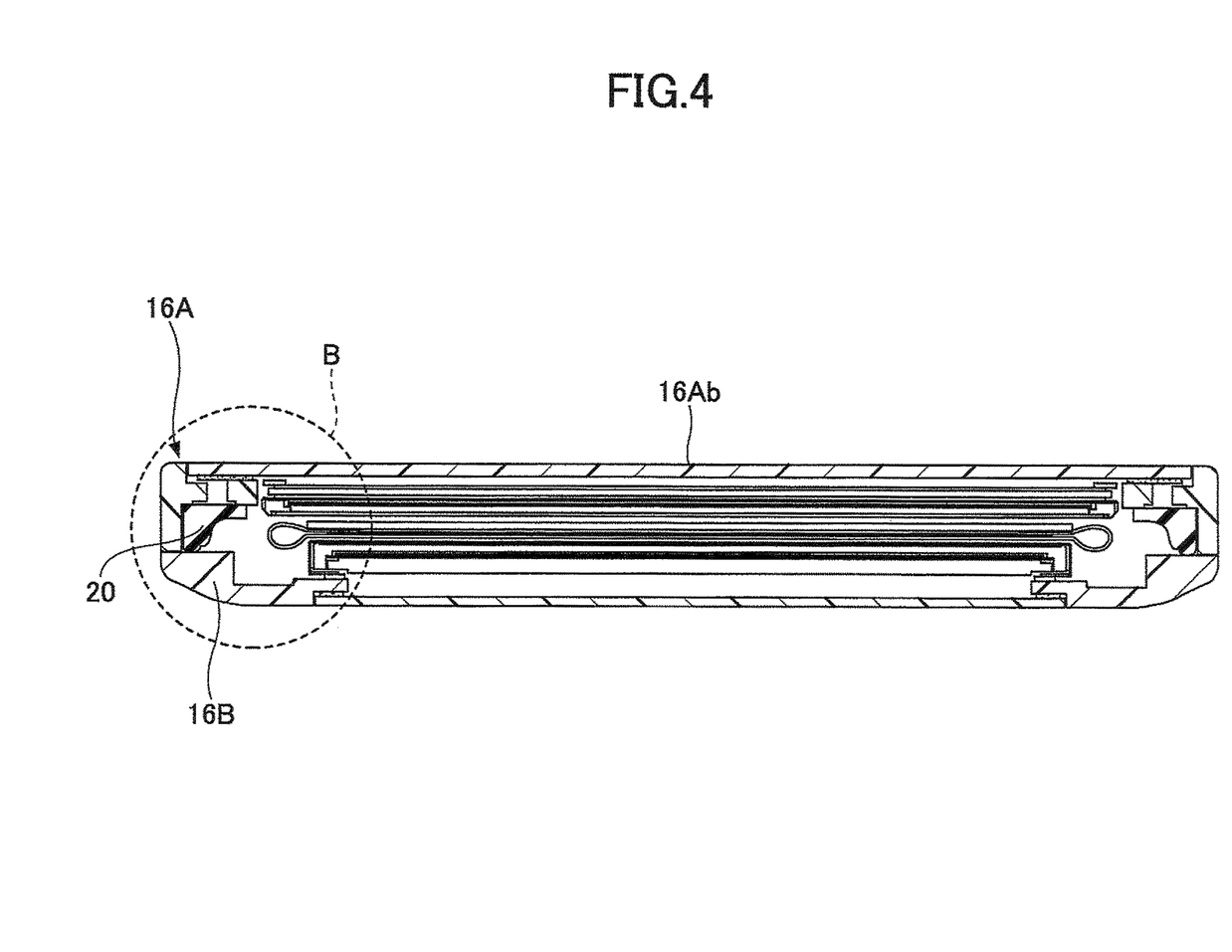
FIG. 4 is a cross-sectional view taken along a line IV-IV of FIG. 1.
Figure 5:
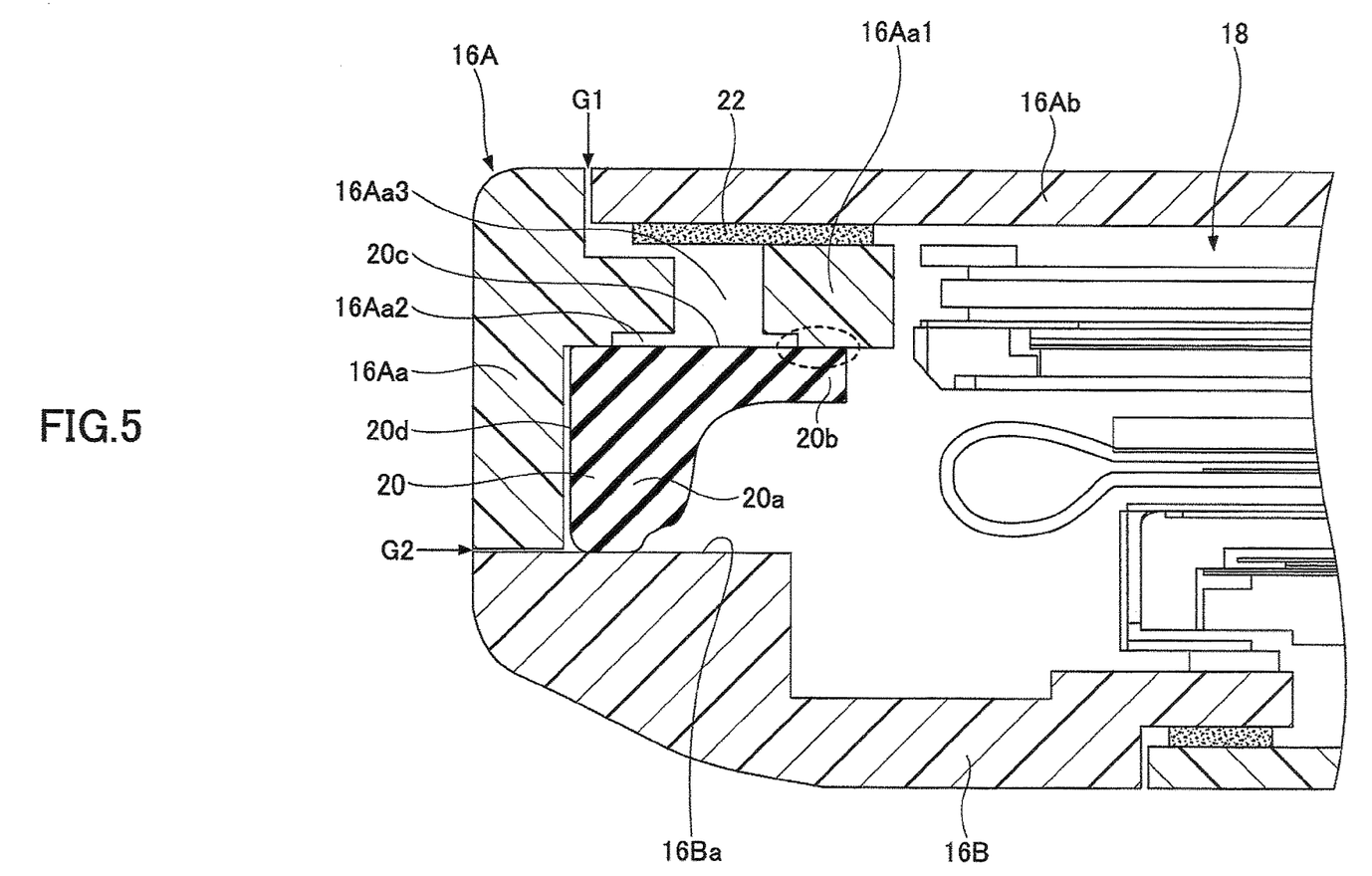
FIG. 5 is an enlarged cross-sectional view of a part B in FIG. 4.

FIG. 4 is a cross-sectional view taken along a line IV-IV of FIG. 1. FIG. 5 is an enlarged cross-sectional view of a part B in FIG. 4. As illustrated in FIG. 4, the case body 16A includes a frame member 16Aa and a transparent panel (plate member) 16Ab covering one side of the frame member 16Aa. The display screen of the LCD unit 18 provided inside the frame member 16Aa can be seen through the transparent panel 16Ab. As illustrated in FIG. 5, the transparent panel 16Ab is fixed to the frame member 16Aa by a double-stick tape 22 so that a gap between the mating surfaces of the transparent panel 16Ab and the frame member 16Aa is sealed by the double-stick tape 22, which is an adhesive material. Accordingly, if water enters (leaks) into the gap between the transparent panel 16Ab and the frame member 16Aa, the water is prevented from entering inside the case body 16A in which the LCD unit 18 is accommodated.

The seal material 20 has a cross-sectional shape as illustrated in FIG. 5, which is a shape in which a thin part 20b extends inward from a thick part 20a in the cross section. Only a surface of the thin part 20b of the seal material 20 is joined with adhesive or welded to a flared portion 16Aa1 of the frame member 16Aa. That is, only a portion of the seal material surrounded by a dotted line is a fixed portion, which is fixed to the case body 16A (frame member 16Aa), and other portions of the seal material 20 are not fixed. Thereby, the seal material 20 is slightly rotatable about an end portion of the thin part 20b (the portion surrounded by the dotted line). However, the seal material 20 is not rotatable in a state where the case lid 16B is attached to the case body 16A. Thus, if a force is applied to the seal material 20 in a rotatable direction, the seal part 20 is subjected to compressional deformation in the rotatable direction.

A top surface 20c of the seal material 20 is a flat surface, which is in contact with the flared portion 16Aa1 of the frame member 16Aa, but only a portion of the top surface 20c in the thin part 20b is fixed as mentioned above. In the flared portion 16Aa1 of the frame member 16Aa, a recessed portion 16Aa2 extending along the top surface 20c of the seal part 20 is formed in a portion where the top surface 20c is in contact with the flared portion 16Aa1.

A water passage 16Aa3, which extends through the flared portion 16Aa1 of the frame member 16Aa, is formed in the recessed portion 16Aa2. The water passage 16Aa3 may be a through hole provided at several positions along the recessed portion 16Aa2, and there is no need to extend continuously along the extending direction of the seal material 20. An end of the water passage 16Aa3 is connected to the recessed portion 16Aa2, and the other end of the water passage 16Aa3 is connected to a gap G1 formed between the frame member 16Aa and the transparent panel 16Ab. Accordingly, water entering through the gap G1 goes through the water passage 16Aa3 and fills the recessed portion 16Aa2. It should be noted that the water entering through the gap G1 does not enter inside the case body 16A because the transparent panel 16Ab is joined with the double-stick tape at an inner portion than the water passage 16Aa3.

When the case lid 16B is attached to the case body 16A, the end of the thick part 20a of the seal material 20 (the lower end in the figure) is set in a state where it is brought into contact with and pressed onto a mating surface 16Ba of the case lid 16B. In this state, the thick part 20a of the seal material 20 elastically deforms (elastically compressed) so that the end of the thick part 20a is close contact with the mating surface 16Ba of the case lied 16B. Thereby, a seal is formed between the seal material 20 and the case lid 16B.

As mentioned above, a seal is formed between the seal material 20 and the case body 16A in the portion where the thin part 20b of the seal material 20 is joined with adhesive or welded to the flared portion 16Aa1 of the frame member 16Aa. Additionally, a seal is formed between the seal material 20 and the case lid 16B by the end of the thick part 20a of the seal material 20, as a contacting portion, being pressed onto the mating surface 16Ba of the case lid 16B. Thus, a waterproof structure is formed by the seal material 20 sealing between the case body 16A and the case lid 16B.

Figure 6:
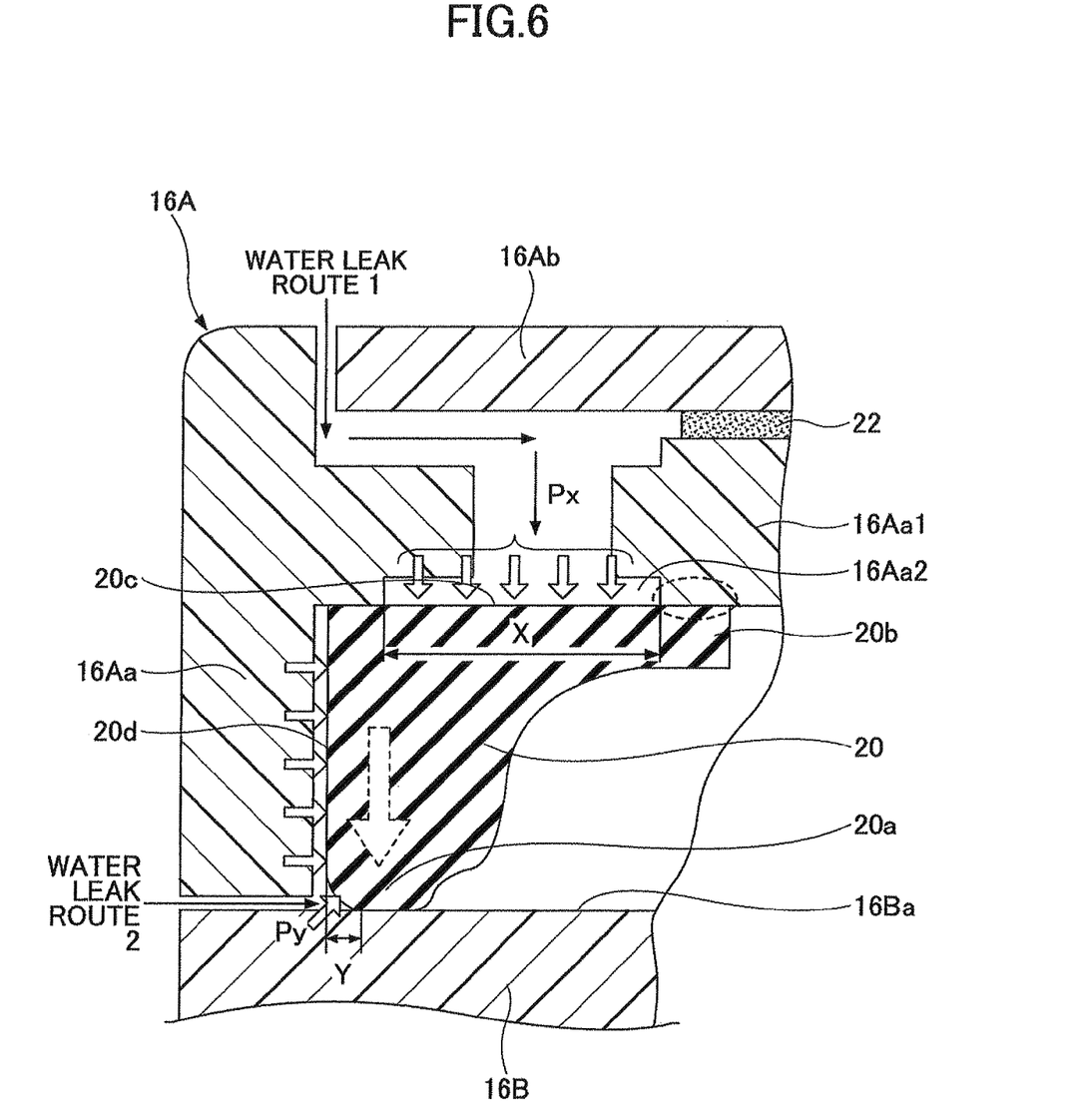
FIG. 6 is a cross-sectional view of a waterproof structure according to the first embodiment.

The above-mentioned waterproof structure can maintain an excellent waterproofing function even if the waterproof-type cellular phone 10 is submerged and a water pressure in an area surrounding the waterproof-type cellular phone 10 is high. A description will be given below, with reference to FIG. 6, of an excellent waterproofing function being maintained even if a water pressure is high. FIG. 6 is a cross-sectional view of the waterproof structure according to the first embodiment.

In FIG. 6, water entering paths (water leak routes 1 and 2) through which water enters (leaks) are indicated by thin arrows. Water pressures generated by the entering water are indicated by thin arrows. The water leak route 1 is a path that goes through the gap G1 between the frame member 16Aa and the transparent panel 16Ab of the case body 16A, goes to the backside of the transparent panel 16Ab, passes through the water passage 16Aa3, and finally reaches the recessed portion 16Aa. The water leak route 2 is a path that goes through a gap G2 between the mating surface of the case body 16A and the mating surface 16Ba of the case lid 16B, and reaches a gap between the case body 16A and the outer circumferential surface of the seal material 20. It should be noted that the gap G2 is not a gap which is intentionally formed. That is, the gap G2 is a naturally-formed gap which is formed when the case lid 16B is fixed to the case body 16A.

If the waterproof-type cellular phone 10 is submerged, water enters through the water leak route 1 and the water leak route 2 and, thereby, a water pressure is applied to the seal material 20. A consideration is given first to a pressure of the water entering from the gap G2 and passing through the water leak route 2. When the water pressure increases, a force of the water to enter between the end of the thick part 20a of the seal material 20 and the mating surface 16Ba of the case lid 16B is increased. Additionally, a force generated by the water to lift the end of the thick part 20a of the seal material 20 is increased due to an upward component Py of the water pressure, and, thereby, the sealing effect of the seal material 20 is decreased. Accordingly, the seal between the seal material 20 and the case lid 16B weakens as the water pressure increases, and water easily enters inside the housing when the water pressure is high.

Thus, according to the present embodiment, an excellent seal property is maintained by improving the seal property between the seal material 20 and the case lid 16B by using a water pressure of water entering through the water leak route 1 to increase a force to press the seal material 20 against the case lid 16B.

The water entering from the gap G1 passes through the water leak route 1 and reaches the recessed portion 16Aa2. Accordingly, a water pressure Px of the water entering the recessed portion 16Aa2 is applied to the top surface 20c of the seal material 20. The direction of the water pressure is a direction in which the seal material 20 is moved downward, that is, a direction in which the end (contacting portion) of the thick part 20a of the seal material 20 is pressed onto the mating surface 16Ba of the case lid 16B. The force to press the seal material 20 onto the case lid 16B (a force indicated by dotted arrow in FIG. 6) corresponds to a force obtained by subtracting a vertical component of the water pressure By applied to the end of the thick part 20a from the water pressure Px applied to the top surface 20c of the seal material 20.

The water pressure Px is applied over a width X indicated in FIG. 6, and the water pressure By is applied over a width Y indicated in FIG. 6. Therefore, a force to press the seal material 20 against the case lid 16B can be generated by setting an extending length Kx of a portion having a width X of the seal material 20 larger than an extending length Ky of a portion having a width Y of the seal material 20 (Kx>Ky). If the extending length Kx of the portion having the width X and the extending length Ky of the portion having the width Y are different, the width X and the width Y may be set so that a relationship X·Ky>Y·Ky is satisfied. Because the width X is equal to a width of the recessed portion 16Aa2 of the frame member 16Aa, the width X may be increased by increasing the width of the recessed portion 16Aa2 of the frame member 16Aa. That is, the recessed portion 16Aa2 is provided to increase a force generated by the water pressure received by the top surface 20c of the seal material 20 by increasing the width X.

The excellent seal property between the seal material 20 and the case body 16A is maintained irrespective of a magnitude of the water pressure because the thin part 20b of the seal material 20 is joined with adhesive or welded to the flared portion 16Aa1 of the frame member 16Aa. The seal material 20 is fixed to only the case body 16A, the case lid 16B can be detached from the case body 16A as usual without giving an influence to the seal property of the seal material 20. Additionally, the same seal property as the seal property provided by the seal material 20 before the case lid 16B is detached can be obtained by merely attaching the case lid 16B, which has been detached from the case body 16A, to the case body 16A.

Figure 7A:
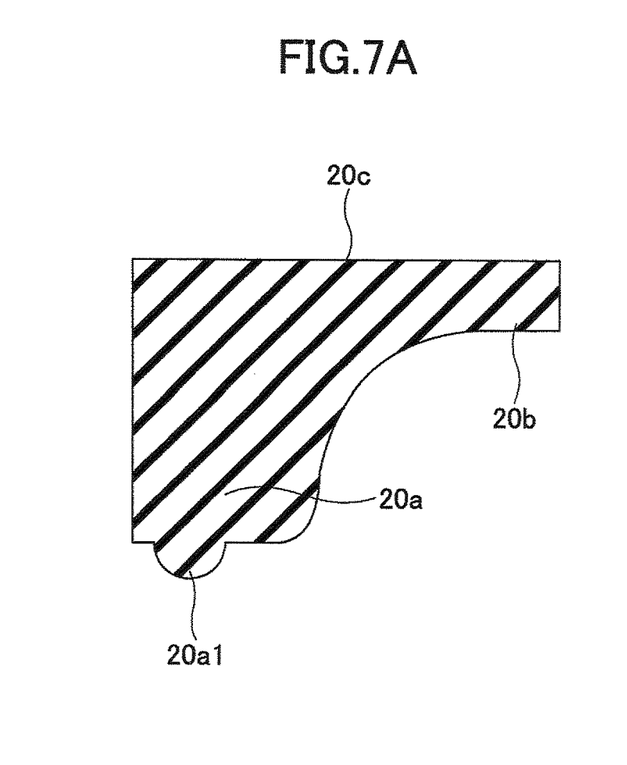
FIG. 7A is a cross-sectional view of an example of a seal material.
Figure 7B:
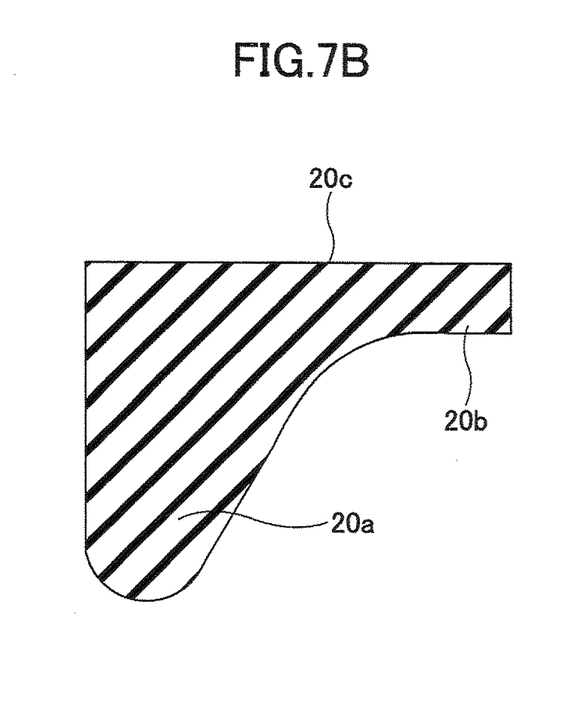
FIG. 7B is a cross-sectional view of another example of the seal material.

The cross-sectional shape of the seal material 20 is not limited to the shape illustrated in FIG. 5 and FIG. 6, and any shape can be adopted if the width of the top surface 20c receiving the water pressure Px can be set large and the thick part 20a is rotatable with respect to the thin part 20b fixed to the case body 16A. For example, as illustrated in FIG. 7A, the seal property can be improved by increasing a surface pressure by providing a projection 20a1 at the end of the thick part 20a. Alternatively, as illustrated in FIG. 7B, the surface pressure can be increased by making the end of the thick part 20a thin. If the thick part 20a can be made rotatable, the thin part 20b is not always made thin, and various shapes may be adopted.

Figure 8:
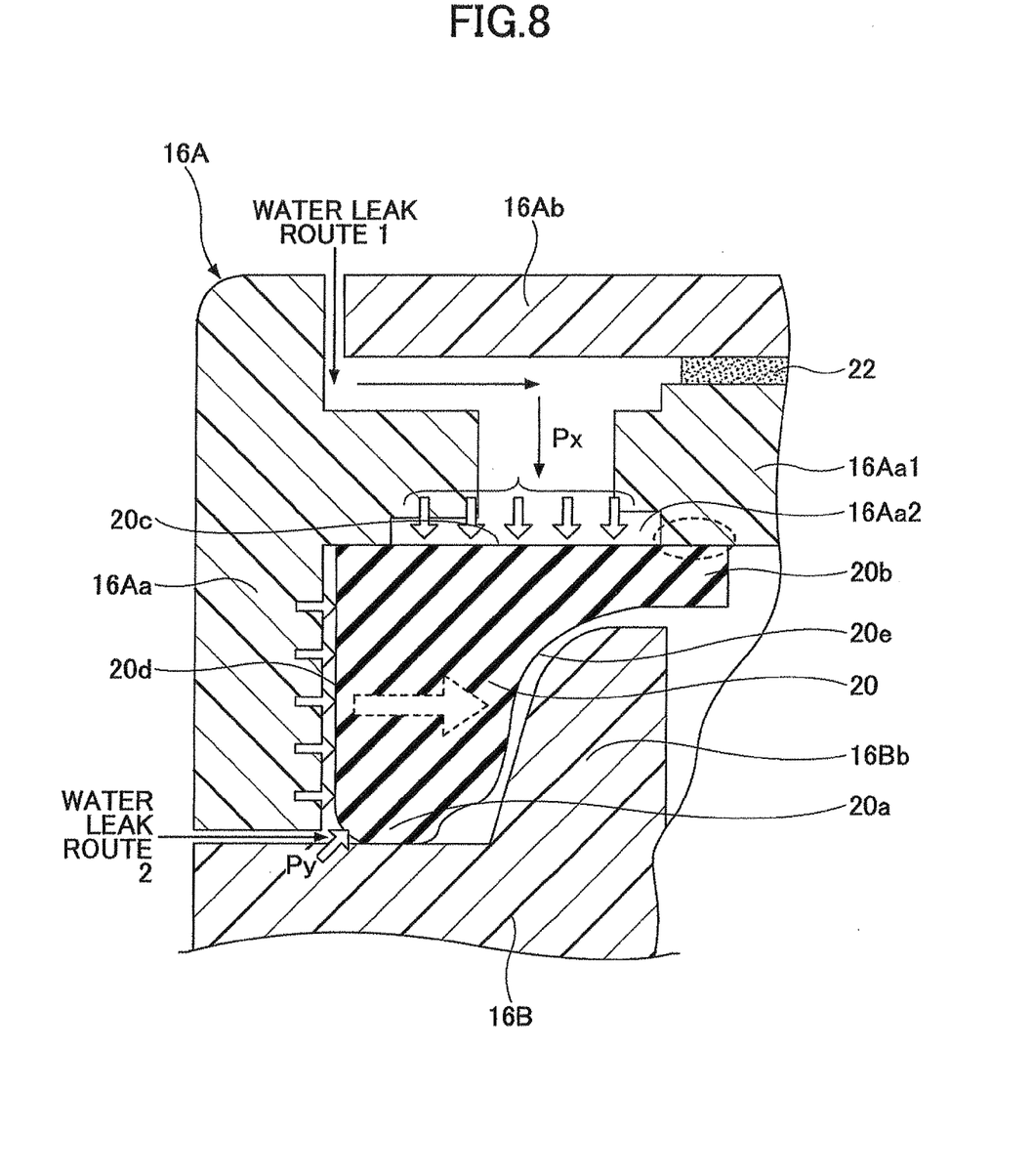
FIG. 8 is a cross-sectional view of a waterproof structure according to a second embodiment.

A description will be given of a second embodiment. FIG. 8 is a cross-sectional view of a waterproof structure according to the second embodiment. In the second embodiment, a rib 16Bb as a projection part is provided to the case lid 16B on an inner side of the seal material 20. The waterproof structure according to the second embodiment has the same structure as the first embodiment except that the rib 16Bb is provided.

The rib 16Bb is a projection part formed on the case lid 16B. The rib 16Bb is provided on a side of the seal material 20 (on a side of an inner surface 20e of the seal material 20) in order to limit a movement of the seal material in a side direction. If a water pressure of water entering through the water leak route 2 is applied to an outer circumferential surface 20d of the seal member 20, a force to move the seal material 20 in a side direction (a force indicated by a dotted arrow in FIG. 8) is generated. If the seal material 20 is moved due to this force in a side direction (inward direction), the seal property may become unstable. Thus, according to the present embodiment, the rib 16Bb is provided to the case lid 16B in a direction of movement of the seal material 20 so that if the seal material 20 slightly moves, the seal material 20 is brought into contact with the rib 16Bb, which prevents the seal material 20 from being moved largely. The rib 16Bb is an example of the projection part, and the projection part is not limited to the rib if the projection part has an outer surface facing the inner surface 20e of the seal material 20. Additionally, the projection part is not limited to a portion formed on the case lid 16B.

Figure 9A:
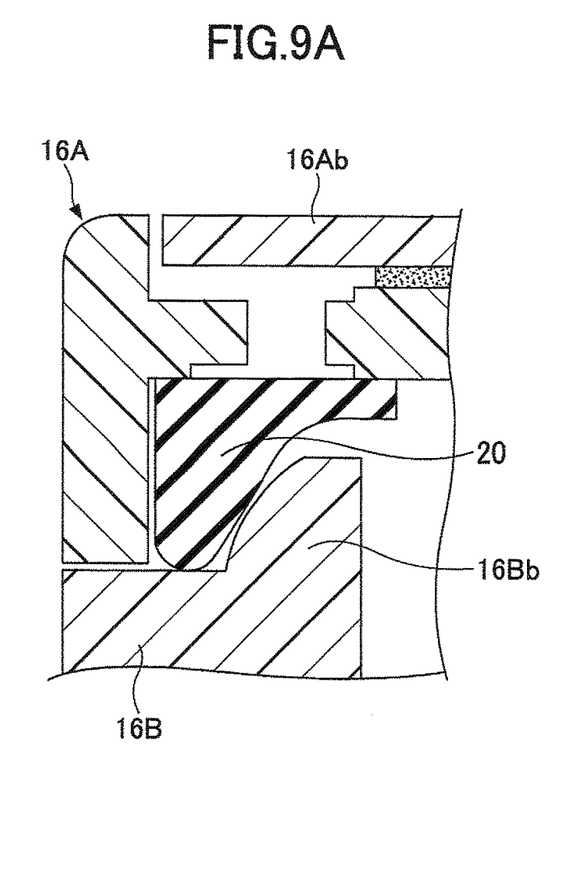
FIG. 9A is a cross-sectional view of an example of a rib.
Figure 9B:
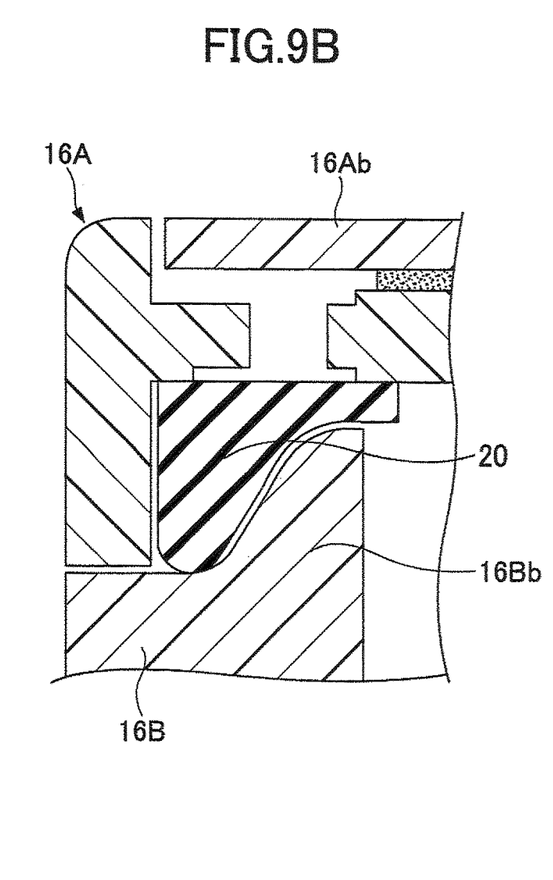
FIG. 9B is a cross-sectional view of another example of the rib.

A small gap is provided between the rib 16Bb and the seal material 20 so that the thick part 20a of the seal material 20 is movable downward. The shape of the outer circumferential surface of the rib 16Bb facing the seal material 20 may be an arcuate shape as illustrated in FIG. 9A. By forming the outer circumferential surface of the rib 16Bb as an arcuate shape, the thick part 20a of the seal material 20 can be made easily rotatable even when the seal material 20 is brought into contact with the rib 16Bb. Alternatively, the outer circumferential surface of the rib 16Bb facing the seal material 20 may be a shape similar to the inner surface 20e of the seal material 20 as illustrated in FIG. 9B in order to surely limit a movement of the seal material in a side direction.

As mentioned above, according to the present embodiment, the effect of achieving a stable seal property can be obtained by limiting a movement of the seal material 20 in addition to the effect that an excellent seal property can be maintained even if a water pressure is high as is in the first embodiment.

Figure 10:
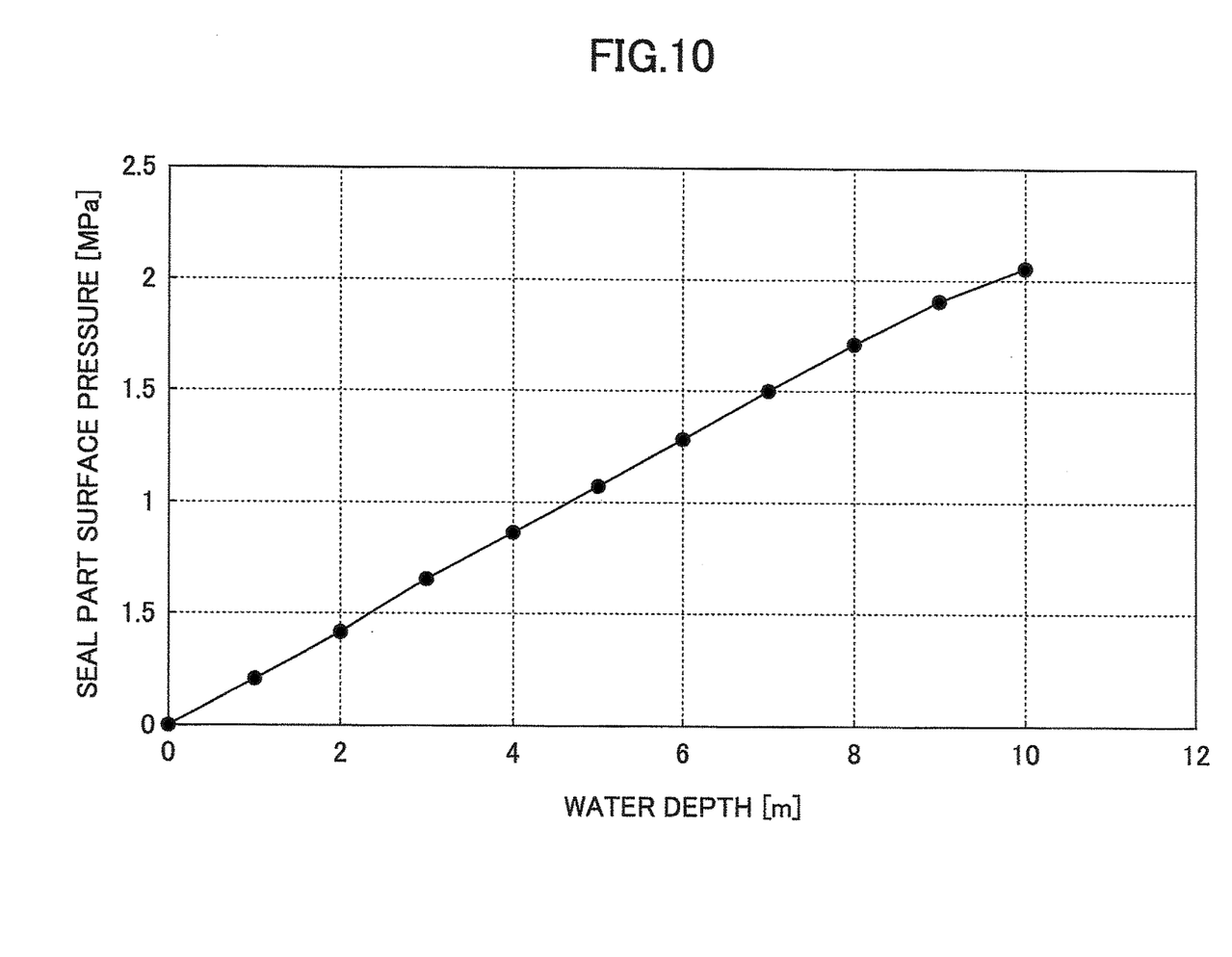
FIG. 10 is a graph indicating changes in a seal part surface pressure with respect to changes in a water depth.

The inventor fabricated the waterproof structure according to the above-mentioned first embodiment to investigate changes in a seal part surface pressure with respect to variation in a water depth. FIG. 10 is a graph indicating a result of the investigation. The seal part surface pressure is a surface pressure exerted on the mating surface 16Ba when the end of the thick part 20a of the seal material 20 is pressed against the mating surface 16Ba of the case lid 16B.

As interpreted from the graph of FIG. 10, the seal part surface pressure was increased as the water depth was increased. The fact that the seal part surface pressure was increased means that the force which presses the seal material 20 against the case lid 16B was increased, which results in improvement in the seal property. Accordingly, it was confirmed that the seal property is improved and an excellent seal property is maintained as the water depth increases and the water pressure increases.

All examples and conditional language recited herein are intended for pedagogical purposes to aid the reader in understanding the principles of the invention and the concepts contributed by the inventor to furthering the art, and are to be construed a being without limitation to such specifically recited examples and conditions, nor does the organization of such examples in the specification relates to a showing of the superiority and inferiority of the invention. Although the embodiment(s) of the present invention (s) has(have) been described in detail, it should be understood that the various changes, substitutions, and alterations could be made hereto without departing from the spirit and scope of the invention.

What is claimed is:

1. A waterproof-type electronic equipment comprising:
   a first case part and a second case part together forming a housing by being fit to each other;
   a seal material provided between said first case part and said second case part, the seal material having a first surface including a fixed portion fixed to an inner surface of said first case part, the seal material further having a contacting portion that makes a convex shape on a side opposite to the first surface to contact with said second case part;
   a recessed portion provided on said inner surface of said first case part and outer side of said fixed portion of said seal material, said recessed portion located at a position where said first surface of said seal material covers an opening of said recessed portion; and
   a passage connecting said recessed portion of said first case part and an exterior of said first case part to each other, the passage being formed inside the first case part.

2. The waterproof-type electronic equipment according to claim 1, wherein:
   said seal material includes a thick part and a thin part;
   said first surface is provided over said thick part and said thin part;
   said fixed portion is said first surface in said thin part; and
   said contacting part is a convex portion formed on a side opposite to said first surface in said thick part.

3. The waterproof-type electronic equipment according to claim 2, wherein a protrusion is formed at an end of said contacting portion of said seal material.

4. The waterproof-type electronic equipment according to claim 1, wherein said second case part includes a projection part facing an inner surface of said seal material.

5. The waterproof-type electronic equipment according to claim 4, wherein an outer circumferential surface of said projection part is formed in an arcuate shape.

6. The waterproof-type electronic equipment according to claim 4, wherein an outer circumferential surface of said projection part is formed in a shape similar to a shape of said inner surface of said seal material.

7. The waterproof-type electronic equipment according to claim 1, wherein said first case part includes a frame member and a plate member covering an opening of said frame member, and said plate member is attached to said frame member by an adhesive and a gap formed between an outer circumference of said plate member and said frame member is a part of said passage.

8. The waterproof-type electronic equipment according to claim 1, wherein said seal material is formed of a material selected from a group consisting of a rubber, a low-hardness elastomer and a closed-cell sponge.

9. The waterproof-type electronic equipment according to claim 1, wherein said fixed portion of said seal material is fixed to said inner surface of said first case part by joining with adhesive or welding.

10. The waterproof-type electronic equipment according to claim 1, wherein the recessed portion extends along the first surface of the seal material with a space formed over the first surface of the seal material.

11. The waterproof-type electronic equipment according to claim 1, wherein the seal material is configured to rotate about the fixed portion of the first surface of the seal material when the second case part is removed from the first case part.

12. The waterproof-type electronic equipment according to claim 11, wherein the seal material is configured to make a compressional deformation in a rotational direction in which the seal material is configured to rotate, in response to application of a force to the seal material in the rotational direction when the second case part is attached to the first case part.

* * * * *